United States Patent
Kamen

(10) Patent No.: US 7,814,098 B2
(45) Date of Patent: Oct. 12, 2010

(54) METHOD AND APPARATUS FOR KEYWORD MASS GENERATION

(76) Inventor: Yakov Kamen, 19334 Greenwood Dr., Cupertino, CA (US) 95014

( * ) Notice: Subject to any disclaimer, the term of this patent is extended or adjusted under 35 U.S.C. 154(b) by 322 days.

(21) Appl. No.: 11/811,658

(22) Filed: Jun. 12, 2007

(65) Prior Publication Data

US 2008/0313170 A1 Dec. 18, 2008

Related U.S. Application Data

(60) Provisional application No. 60/813,018, filed on Jun. 14, 2006.

(51) Int. Cl.
*G06F 17/30* (2006.01)

(52) U.S. Cl. .............. 707/726; 707/748; 707/749; 705/10; 704/4

(58) Field of Classification Search ............. 707/3–5, 707/104.1, 726, 748–749; 704/4, 231; 705/10
See application file for complete search history.

(56) References Cited

U.S. PATENT DOCUMENTS

| | | | |
|---|---|---|---|
| 5,428,707 A * | 6/1995 | Gould et al. ............... 704/231 |
| 6,363,378 B1 * | 3/2002 | Conklin et al. ............... 707/5 |
| 2002/0120619 A1 * | 8/2002 | Marso et al. ............... 707/3 |
| 2004/0122656 A1 * | 6/2004 | Abir ............... 704/4 |
| 2005/0073958 A1 * | 4/2005 | Atlas et al. ............... 370/238 |
| 2005/0159996 A1 * | 7/2005 | Lazarus et al. ............... 705/10 |
| 2006/0031219 A1 * | 2/2006 | Chernyak et al. ............... 707/5 |
| 2007/0156677 A1 * | 7/2007 | Szabo ............... 707/5 |
| 2007/0288433 A1 * | 12/2007 | Gupta et al. ............... 707/3 |
| 2008/0133479 A1 * | 6/2008 | Zelevinsky et al. ............... 707/3 |

* cited by examiner

*Primary Examiner*—don wong
*Assistant Examiner*—Hanh B Thai

(57) ABSTRACT

A method and apparatus in accordance with the invention which, for any given keyword, generates a numeric value that defines keyword relevance based on the number and importance of a keyword's forward link and back link keyword neighbors.

14 Claims, 1 Drawing Sheet

METHOD AND APPARATUS FOR KEYWORD MASS GENERATION

CROSS-REFERENCE TO RELATED APPLICATIONS

This application claims the benefit of provisional patent 60/813,018 filed 2006 Jun. 14 by the present inventor.

FEDERALLY SPONSORED RESEARCH

Not applicable

SEQUENCE LISTING OF PROGRAM

Not applicable

BACKGROUND OF THE INVENTION

This invention pertains to technology used for data search, particularly data search over the Internet.

In many practical applications such as documents storing, searching, comparative analysis, and reconstruction, it is extremely important to have a solution allowing a user to compare and rank different keywords associated with documents.

Unfortunately such solution does not exist today, and there are many reasons for this.

First of all, the number of keywords used in any language is incredibly large. For example, there are over 200,000 general purpose words and over 500,000 special words and abbreviations in the English language alone. The number of keywords combing two, three, or four words (called terms) in the English language is respectively 5, 10, and 15 orders of magnitude larger.

Second, there are many parameters characterizing keywords from different points of view. Some of them contradict with others. For example, a search engine operator can characterize keywords by a number of available matches, number of assigned advertisements, or keyword CTR (click through rate). An Internet user can characterize keyword by language, complexity, length, or popularity. An advertiser can characterize keywords by biding prices, generated traffic, CPM, or conversion rate.

Third, there is a lack of any theoretical models that can effectively aggregate multiple viewpoints together in the unified working system to practically address the problem of comparing and ranking keywords and terms.

The proposed invention defines a method and apparatus to compute keyword masses based on the invented keyword mass computation technology.

SUMMARY

The main idea of the invention is to create a universal keyword relevance measure number. We will refer to the keyword relevance number as a K-mass. The invention proposes to compute K-mass by aggregating two intrinsic keyword parameters: forward link and back link (also known as "backlink") strengths. The forward link strength ("SF") of the keyword K is a numerical coefficient describing how many other keywords are defined by keyword K as its neighbors (keywords close in meaning and/or co-occurance with K), how similar they are to K, and the aggregation of these two factors for all of K's neighbors (also known as "strength"). The back link strength ("SB") of a keyword K is a numerical coefficient describing how many other keywords define K as their neighbor, K's strength, and K's similarity to them.

In other words, K-mass of keyword K is an aggregated strength of keywords that K can "see" and keywords that can "see" K. The measure of similarity between a keyword K and its neighbor keyword L is also called the "proximity score" of L relative to K. In one embodiment of this invention proximity score of L relative to K is the inverse of the rank of L in an ordered list of K's neighbor keywords. We will also refer to a neighbor keyword as a "neighbor" below.

In one embodiment of the invention forward and back links aggregation is a function A(N, SF, SB) of the number of words (terms) in the keyword (1, 2, 3, . . . ), and the strengths of SF and SB.

In one embodiment of the invention SF and SB are each computed as a number of appropriate neighbor keywords—SF is computed as a number of neighbor keywords of K, and SB is computed as a number of keywords that have K as a neighbor.

In one embodiment of the invention the back links aggregation function is defined as follows:

$$A(N,SF,SB)=f(\alpha \times g_F(N) \times h_F(SF),(1-\alpha) \times g_B(N) \times h_B(SB)),$$

where $SF = \Sigma r_i^f \times sf_i$;

$SB = \Sigma r_i^b \times sb_i$;

α—is a forward link strength weight coefficient;

$r_i^f$—is proximity between keyword K and its forward link neighbor number "i";

$r_i^b$—is proximity between keyword K and its back link neighbor number "i";

$sf_i$—is strength of the forward link neighbor number "i";

$sb_i$—is strength of the back link neighbor number "i";

$h_F(SF)$—is a monotonically increasing function such as $h_F(x) \geq 1$, $h_F(1)=1$;

$h_B(SB)$—is a monotonically increasing function such as $h_B(x) \geq 1$, $h_B(1)=1$;

$g_F(N)$, $g_B(N)$—non-decreasing functions of number of keyword terms such as $g_F(1)=1$, $g_B(1)=1$;

f(.)=general average function. A function $F(x_1 \ldots x_n)$ is called general average when $\min(x_1 \ldots x_n) \leq F(x_1 \ldots x_n) \leq \max(x_1 \ldots x_n)$.

DETAILED DESCRIPTION

Figure 1:
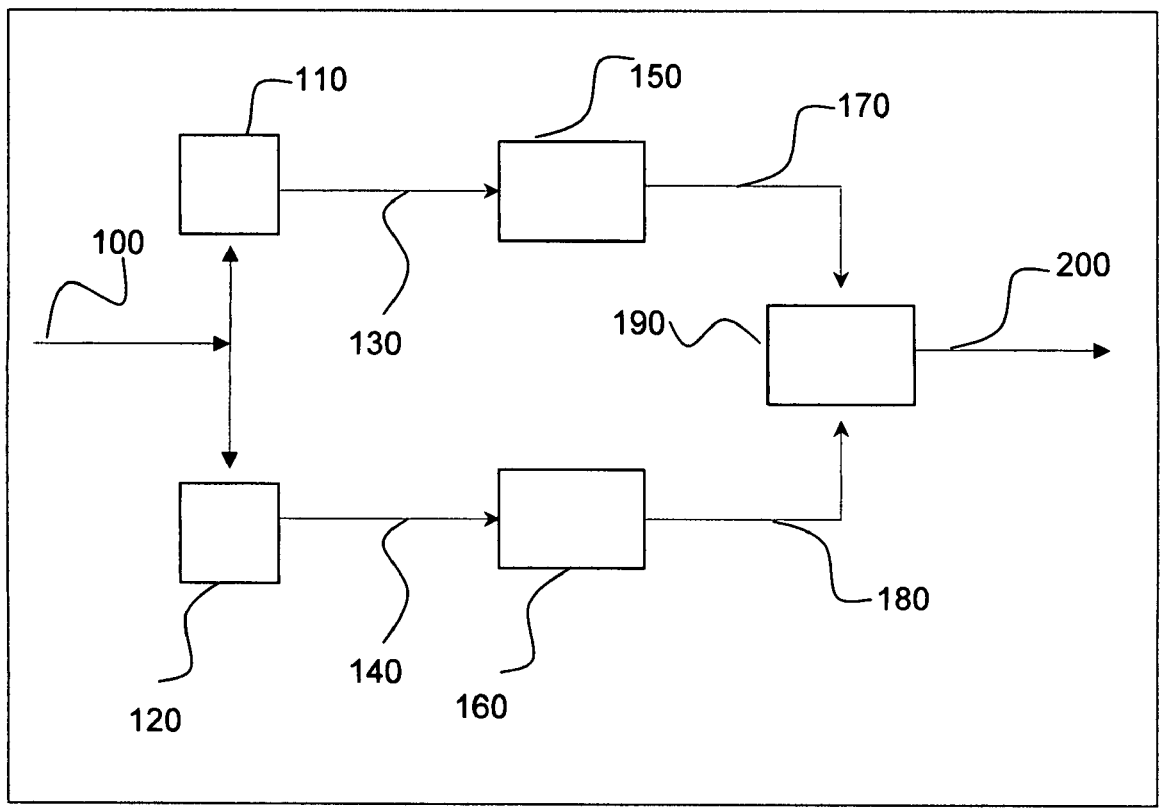
FIG. 1—shows a preferred embodiment system block diagram.

This invention is related to FIG. 1 which describes the preferred embodiment of the invention. In FIG. 1, keyword 100 is entered into a system to generate its K-mass. Block 110 generates or finds in a database a set of forward link keywords and their forward link proximity scores 130. Block 120 generates or finds in a database a set of back link keywords and their back link proximity scores 140. Block 150 generates keyword's K forward link strength 170. Block 160 generates keyword's K back link strength 180. Block 190 aggregates forward link strength 170 and back link strength 180 and produces a final keyword's K-mass.

For example, let's assume that keyword K has three forward neighbors with relevance scores and strengths (1, 300), (0.90, 450), (0.7, 400). Let's assume that it has four back link neighbors with relevance and strengths (1, 440), (0.95, 470), (0.60, 350), (0.50, 600). Defining weigh coefficient as 0.5 and $g_F(2)=4$, $g_B(2)=4$, $h_F(x)=h_B(x)=\ln(1+x)$, and f(.) as an arithmetic mean we will compute K-mass as $$A = 4(0.5\ln(1 + 300 + 0.9*450 + 0.7*400)$$
$$+ 0.5\ln(1 + 440 + 0.95*470 + 0.6*350 + 0.5*600))$$
$$= 40.79$$

Additional Embodiments

In one embodiment of the invention K-mass is generated using additional information about a keyword's popularity (average number of searches per day) and a keywords click through rate.

In one embodiment of the invention strength of a forward link neighbor is defined as the number of its neighbors.

In one embodiment of the invention the strength of the back link neighbor is defined as a number of its neighbors.

In one embodiment of the invention $h_F(.)$ and $h_B(.)$ are defined as follows:
$h_F(x)=1+a_F \times \ln(x)$, $h_B(x)=1+a_B \times \ln(x)$, where $a_F$ and $a_B$ are positive numbers Although the above description contains much specificity, the embodiments described above should not be construed as limiting the scope of the invention but rather as merely illustrations of some presently preferred embodiments of this invention.

The invention claimed is:

1. A computer-implemented method of computing a keyword's mass indicating keyword's relevance using a programmed computer apparatus, comprising:
   (i) electronically computing a strength of a keyword based on an electronically-computed keyword strength criteria,
   (ii) electronically computing a list of forward link neighbor keywords for a keyword and electronically-computed proximity scores of said neighbor keywords relative to said keyword,
   (iii) electronically computing a list of back link neighbor keywords for a keyword and electronically-computed proximity scores of said keyword relative to said neighbor keywords,
   (iv) electronically computing the keyword mass as an aggregation function of at least one of the following: the strength of said keyword, strengths of the forward link neighbor keywords to said keyword, strengths of the back link neighbor keywords to said keyword, the proximity scores of the forward link neighbor keywords relative to said keyword, the proximity scores the back link neighbor keywords relative to said keyword, a measure of word quantity in said keyword, measures of word quantity in the forward link neighbor keywords for said keyword, and measures of word quantity in the back link neighbor keywords for said keyword; wherein (a) the forward link strength of said keyword is electronically computed as a function of at least one of the following: the strength of said keyword, the strength of forward link neighbors of said keyword, the measure of word quantity in said keyword, and the measures of word quantity in the forward link neighbors of said keyword; (b) the back link strength of said keyword is electronically computed as a function of at least one of the following: a strength of said keyword, the strength of the back link neighbors of said keyword, the measure of word quantity in said keyword, and the measures of word quantity of the back link neighbors of said keyword; (c) the keyword's mass is electronically computed as a function of at least one of the following: the strength of said keyword, the forward link strength of said keyword, and the back link strength of said keyword.

2. The method of claim 1 wherein said proximity score is electronically computed as a function of a neighbor keyword ranks in an ordered list of neighbor keywords.

3. The method of claim 1 wherein said forward link strength is electronically generated using a pre-defined list of forward link neighbor keywords and proximity scores.

4. The method of claim wherein said back link strength is electronically generated using a pre-defined set of back link neighbor keywords and proximity scores.

5. The method of claim 1 wherein said forward link strength is electronically generated using a measure of keyword quantity of said keyword's forward link neighbor keywords.

6. The method of claim 1 wherein said back link keyword strength is electronically generated using a measure of keyword quantity of said keyword's back link neighbor keywords.

7. The method of claim 1 wherein said forward link and back link strengths of said keyword are generated with human interactions.

8. A computer apparatus for electronically computing a keyword's mass, comprising:
   (i) electronic computational module that computes a strength of a keyword based on an electronically-computed keyword strength criteria,
   (ii) electronic computational module that determines a list of forward link neighbor keywords for a keyword and electronically-computed proximity scores of said neighbor keywords relative to said keyword,
   (iii) electronic computational module that determines a list of back link neighbor keywords for a keyword and electronically-computed proximity scores of said keyword relative to said neighbor keywords,
   (iv) electronic computational module that determines the keyword mass as an aggregation function of at least one of the following: (a) the forward link strength of said keyword is electronically determined as a function of at least one of the following: the strength of said keyword, the strength of forward link neighbors of said keyword, the measure of word quantity in said keyword, and the measures of word quantity in the forward link neighbors of said keyword; (b) the back link strength of said keyword is electronically determined as a function of at least one of the following: a strength of said keyword, the strength of the back link neighbors of said keyword, the measure of word quantity in said keyword, and the measures of word quantity of the back link neighbors of said keyword; (c) the keyword's mass is electronically determined as a function of at least one of the following: the strength of said keyword, the forward link strength of said keyword, and the back link strength of said keyword.

9. The method of claim 8 wherein said proximity score is electronically computed as a function of neighbor keyword ranks in an ordered list of neighbor keywords.

10. The method of claim 8 wherein said forward link strength is electronically generated using a pre-defined list of forward link neighbor keywords and proximity scores.

11. The method of claim 8 wherein said back link strength is electronically generated using a pre-defined set of back link neighbor keywords and proximity scores.

12. The method of claim 8 wherein said forward link strength is electronically generated using a measure of keyword quantity of said keyword's forward link neighbor keywords.

13. The method of claim 8 wherein said back link keyword strength is electronically generated using a measure of keyword quantity of said keyword's back link neighbor keywords.

14. The method of claim 8 wherein said forward link and back link strengths of said keyword are generated with human interaction.

\* \* \* \* \*